US008533125B2

(12) United States Patent
Cherneff

(10) Patent No.: US 8,533,125 B2
(45) Date of Patent: Sep. 10, 2013

(54) SYSTEM AND METHOD FOR ANALYZING TRANSPORTATION DATA

(75) Inventor: Jonathan Cherneff, Roslindale, MA (US)

(73) Assignee: Carrier Corporation, Farmington, CT (US)

( * ) Notice: Subject to any disclaimer, the term of this patent is extended or adjusted under 35 U.S.C. 154(b) by 397 days.

(21) Appl. No.: 12/741,458

(22) PCT Filed: Feb. 28, 2008

(86) PCT No.: PCT/US2008/055268
§ 371 (c)(1),
(2), (4) Date: May 5, 2010

(87) PCT Pub. No.: WO2009/108198
PCT Pub. Date: Sep. 3, 2009

(65) Prior Publication Data
US 2010/0223195 A1    Sep. 2, 2010

(51) Int. Cl.
*G06Q 30/00* (2012.01)

(52) U.S. Cl.
USPC .......................................................... 705/333

(58) Field of Classification Search
USPC .................................... 705/333, 1.1
See application file for complete search history.

(56) References Cited

U.S. PATENT DOCUMENTS

| 6,600,418 | B2 | 7/2003 | Sainati et al. |
| 7,110,976 | B2 | 9/2006 | Heimermann et al. |
| 7,138,913 | B2 | 11/2006 | Mackenzie et al. |
| 7,142,110 | B2 | 11/2006 | Schmidtberg et al. |
| 7,149,658 | B2 * | 12/2006 | Kadaba ......................... 702/184 |
| 7,250,858 | B2 | 7/2007 | Schmidtberg et al. |
| 7,676,487 | B2 * | 3/2010 | Groenveld ............. 707/999.102 |
| 2003/0009396 | A1 | 1/2003 | Devries |
| 2005/0006469 | A1 | 1/2005 | Nonneman et al. |
| 2005/0021425 | A1 | 1/2005 | Casey |
| 2005/0055268 | A1 | 3/2005 | Schmidtberg et al. |
| 2005/0177436 | A1 | 8/2005 | Menninger |
| 2005/0209977 | A1 * | 9/2005 | Avant et al. .................... 705/402 |
| 2005/0219085 | A1 * | 10/2005 | Baldwin et al. ............... 341/106 |
| 2006/0200261 | A1 | 9/2006 | Monette et al. |
| 2006/0253343 | A1 | 11/2006 | Gregersen et al. |
| 2007/0156545 | A1 | 7/2007 | Lin |
| 2007/0208680 | A1 | 9/2007 | Wang et al. |
| 2007/0247277 | A1 | 10/2007 | Murchison et al. |
| 2007/0273518 | A1 | 11/2007 | Lupoli et al. |
| 2007/0282716 | A1 | 12/2007 | Branigan et al. |
| 2007/0288160 | A1 | 12/2007 | Ebert |
| 2007/0294137 | A1 * | 12/2007 | Zett ................................ 705/26 |

OTHER PUBLICATIONS

Search Report and Written Opinion mailed on Jul. 25, 2008 for PCT/US08/55268.
Supplementary European Search Report for EP08730943 mailed Sep. 6, 2011.
International Preliminary Report on Patentability Aug. 31, 2010.

* cited by examiner

*Primary Examiner* — Shannon Campbell
(74) *Attorney, Agent, or Firm* — Carlson, Gaskey & Olds, PC

(57) ABSTRACT

A system and method of analyzing transportation data includes receiving a transportation data set including transportation data corresponding to at least one item. A portion of the transportation data is converted into an event string, which includes a plurality of event symbols corresponding to a plurality of transportation events. The event string is selectively filtered according to a query to produce a filtered event string, and transportation data associated with the filtered event string may be reported.

18 Claims, 5 Drawing Sheets

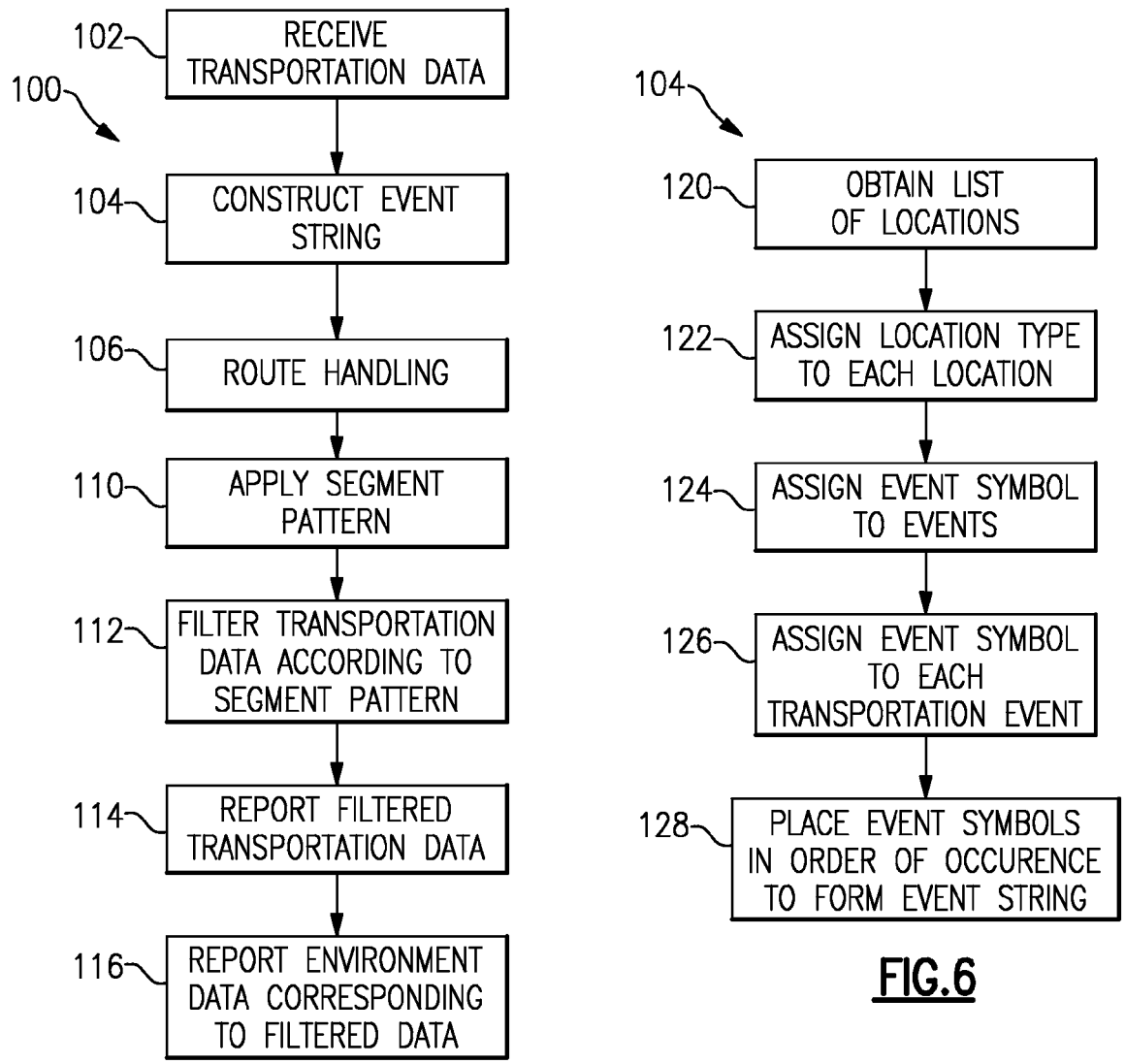

FIG.8

| EVENT | EVENT SYMBOL |
|---|---|
| SUPPLIER ARRIVAL | A |
| SUPPLIER DEPARTURE | B |
| DISTRIBUTION CENTER ARRIVAL | C |
| DISTRIBUTION CENTER DEPARTURE | D |
| RETAIL ARRIVAL | E |
| REATAIL DEPARTURE | F |
| MONITOR START | O |
| MONITOR STOP | 1 |
| CONDITION START | X |
| CONDITION STOP | Y |

FIG.9a

| EVENT STRING |
|---|
| OXBCDEFEYF1 |

FIG.9b

| EVENT STRING |
|---|
| OXBCDefEYF1 |

FIG.5

| DATE | TIME | EVENT | EVENT SYMBOL |
|---|---|---|---|
| 1/2/2007 | 9:00 AM | MONITOR START | O |
| 1/2/2007 | 10:00 AM | CONDITION START | X |
| 1/2/2007 | 10:20 AM | DEPART ACME SUPPLIER | B |
| 1/4/2007 | 12:00 AM | ARRIVE AT ST.LOUIS DC | C |
| 1/5/2007 | 1:00 PM | DEPART ST.LOUIS DC | D |
| 1/6/2007 | 7:30 PM | ARRIVE STORE #1 | E |
| 1/6/2007 | 7:50 PM | DEPART STORE #1 | F |
| 1/6/2007 | 10:00 PM | ARRIVE STORE #2 | E |
| 1/7/2007 | 8:00 PM | CONDITION STOP | Y |
| 1/7/2007 | 8:20 PM | DEPART STORE #2 | F |
| 1/9/2007 | 9:00 AM | MONITOR STOP | 1 |

FIG.7

| LOCATION | LOCATION TYPE |
|---|---|
| ACME SUPPLY | SUPPLIER |
| ST. LOUIS | DISTRIBUTION CENTER |
| STORE #1 | RETAIL |
| STORE #2 | RETAIL |

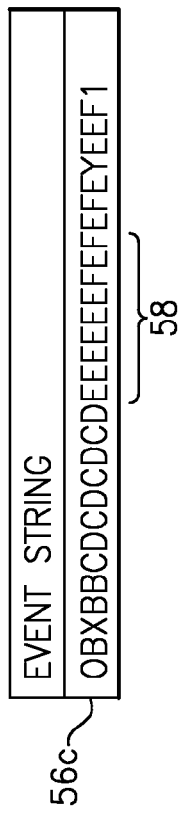
FIG.10a
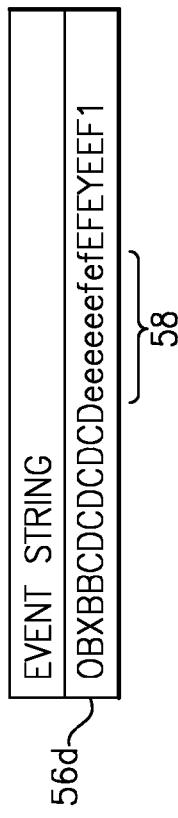
FIG.10b
| QUERY | SEGMENT PATTERN | FILTERED DATA |
|---|---|---|
| FULL TRIP | O.*1 | OBXBBCDCDCDeeeeeefefEFEYEEF1 |
| CONDITIONED TRIP | X.*Y | XBBCDCDCDeeeeeefefEFEY |
| DISTRIBUTION CENTER | C[CD]*D | CDCDCDCD |
| CONDITIONED RETAIL | E.*Y(?=.*F) | EFEY |
| RETAIL | E.*F | EFEYEEF |
| RETAIL CONDITIONAL | (E.*Y(?=.*F))\|(?<!Y.*)E[^Y]*F | EFEY |
FIG.11

SYSTEM AND METHOD FOR ANALYZING TRANSPORTATION DATA

This application is a United States National Phase application of PCT Application No. PCT/US2008/055268 filed Feb. 28, 2008.

BACKGROUND OF THE INVENTION

This invention relates to systems and methods for analyzing data, and more particularly to a system and method for analyzing transportation data.

Many businesses ship goods from an initial location, such as a supplier, to a secondary location, such as a retail location, or to an intermediate location, such as a distribution center. Goods may also arrive and depart from multiple retail locations before reaching a destination retail location. The term "supply chain" usually refers to this transportation of goods from supplier to customer. Transportation data may be recorded at each location. Transportation data may include a time and date of arrival and departure of a particular set of goods. In some cases, radio frequency identification ("RFID") tags may be placed on a group of goods to assist in recording transportation data.

In addition to tracking a time of arrival and departure of goods, additional transportation data may be recorded, such as environment data. In the example of perishable food items, a temperature of the goods may be recorded to ensure that perishable goods remain within a required temperature range. The term "cold chain" is used to refer to a temperature-controlled supply chain.

Analyzing a supply chain can be complex and computationally demanding. In particular, when a company uses multiple couriers to transport a high volume of goods having different shipping requirements to multiple secondary locations and multiple intermediate locations, the complexity of analyzing supply chain data can increase significantly.

SUMMARY OF THE INVENTION

A method of analyzing transportation data includes receiving a transportation data set including transportation data corresponding to at least one item. A portion of the transportation data is converted into an event string, which includes a plurality of event symbols corresponding to a plurality of transportation events. The event string is selectively filtered according to a query to produce a filtered event string, and transportation data associated with the filtered event string may be reported.

A system for analyzing transportation data includes a transportation data set and a computer including a microprocessor operable to convert a portion of transportation data set corresponding to the at least one transportation item into an event string including a plurality of event symbols, to selectively filter the event string in response to a query to produce a filtered event string, and to report transportation data corresponding to the filtered event string.

These and other features of the present invention can be best understood from the following specification and drawings, the following of which is a brief description.

BRIEF DESCRIPTION OF THE DRAWINGS

FIG. 4 schematically illustrates a method of analyzing transportation data.

FIG. 5 illustrates example transportation data.

FIG. 6 schematically illustrates a method of converting transportation data into an event string.

FIG. 7 illustrates a plurality of example locations.

FIG. 8 illustrates a plurality of example events and event symbols.

FIG. 9a illustrates an example event string.

FIG. 9b illustrates the event string of FIG. 9a after application of route handling.

FIG. 10a illustrates an example event string.

FIG. 10b illustrates the event string of FIG. 10a after application of route handling.

FIG. 11 illustrates a plurality of example segment patterns.

DETAILED DESCRIPTION OF THE PREFERRED EMBODIMENT

Figure 1:
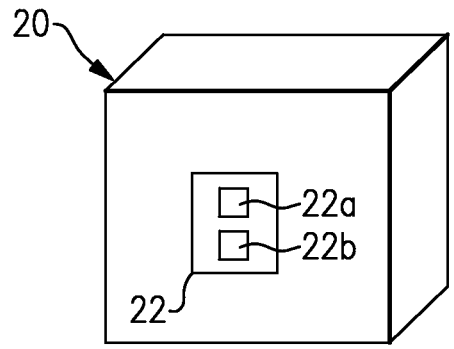
FIG. 1 schematically illustrates an example transportation item.

FIG. 1 schematically illustrates an example transportation item 20. A data recordation unit 22 is coupled to the transportation item 20. The data recordation unit 22 includes a unique identifier 22a, and may optionally include a monitor 22b to record environment data, such as temperature data, at a predefined set of intervals. In one example, the unique identifier 22a corresponds to an RFID tag having a global location number. It is understood that the data recordation unit 22 may be associated with, but not coupled to, the transportation item 20, and that the data recordation unit 22 does not necessarily need its own unique identifier. For example, the transportation item 20 can include a unique identifier.

Figure 2:
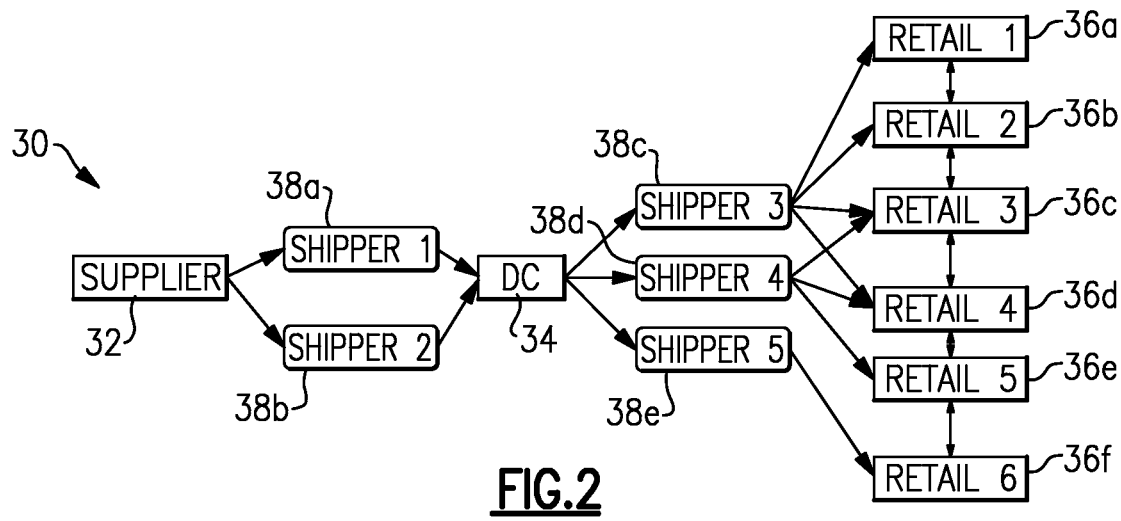
FIG. 2 schematically illustrates an example supply chain.

FIG. 2 schematically illustrates an example supply chain 30 for goods, such as the transportation item 20. The supply chain 30 includes a supplier 32, a distribution center 34, and a plurality of retail locations 36a-f. Multiple shippers 38a-e may be used to transport goods to the various locations 32, 34, 36 in the supply chain 30.

Figure 3:
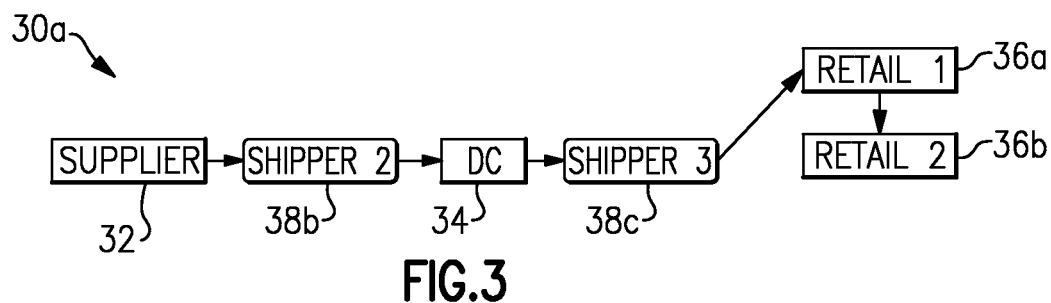
FIG. 3 schematically illustrates a subset of the supply chain of FIG. 2.

FIG. 3 schematically illustrates a supply chain 30a which is a subset of the supply chain 30 of FIG. 2. As shown in FIG. 3, shipper 38b transports goods from supplier 32 to distribution center 34, and shipper 38c transports the goods from distribution center 34 to retail locations 36a-b. For goods delivered to retail location 36b, retail location 36a may be considered an intermediate location.

FIG. 4 schematically illustrates a non-limiting embodiment of a method 100 of analyzing transportation data associated with a supply chain, such as the supply chain 30a. However, it is understood that the method 100 is not limited to supply chain analysis, and could be applied to other areas. Transportation data 40 (see FIG. 5) associated with the supply chain 30a is received (step 102). It is understood that transportation data 40 associated with many items, not just a single item, may be received in step 102. The transportation data 40 includes a date 42 and a time 44 for each of a plurality of transportation events 46. However, it is understood that the transportation data 40 may include additional information, such as a temperature associated with a transportation event 46.

The transportation data 40 is then converted into an event string (step 104; see FIG. 6). A list of locations 48 (see FIG. 7) is obtained (step 120), and a location type 51 is assigned to each location (step 122).

An event symbol 50 is assigned to a plurality of possible events 52 (step 124; see FIG. 8), which includes assigning an event symbol 50 to transportation events 52a-52f occurring at each location type 51 (step 124), and may also include assigning an event symbol 50 to events such as a monitor start 52g, monitor stop 52h, condition start 52i, or condition stop 52j. The monitor start 52g and monitor stop 52h correspond to a start and stop of the monitor 22b. The condition start 52i and condition stop 52j may be inserted into received transportation data 40 to indicate a beginning and end of valid data. Because a monitor 22b may be started before being attached to the transportation item 20 and may be stopped after being removed from the transportation item 20, there may be recorded environment data that is erroneous. The condition start 52i and condition stop 52j may be used to prevent erroneous data from affecting analysis of transportation data 40 and environment data.

An event symbol 50 is assigned to each event 46 in the transportation data 40 (step 126). As shown in FIG. 8, each event symbol 50 may be a single unique alphanumeric character. The event symbols 50 are placed in order of occurrence to form an event string 56 (step 128; see FIG. 9a or 9b). In one example, each event symbol 50 in the event string 56 is a data structure having a plurality of attributes to store transportation data associated with the event symbol, such as date 42, time 44, location 48, and temperature.

Returning to FIG. 4, route handling (step 106) may be applied to the event string 56 to distinguish intermediate locations from final locations. This may include assigning a default type setting, such as upper-case, to transportation events 46 corresponding to an arrival or departure, and assigning a second type setting, such as lower-case, to intermediate arrivals and departures within a location type. Instead of using differing case settings, other steps may be taken to distinguish intermediate locations, such as assigning alternate event symbols to intermediate locations.

For example, the transportation data 40 indicates an "Arrive Store #1" event ("E"), a "Depart Store #1" event ("F"), and an "Arrive Store #2" event ("E"), indicating that retail location 36a was an intermediate location on the way to retail location 36b. Therefore, the "Arrive Store #1" and "Depart Store #1" events may be assigned a lower-case type setting in a route-handled event string 56a (see FIGS. 9b, 10b), or may be assigned alternate event symbols as described above.

Because transportation data may be compiled in an automated fashion, such as using RFID, it is possible for errors, such as duplication of real events, to arise in transportation data collection. For example, a single transportation event may be recorded multiple times to form a duplicative portion 58 of an event string 56c (see FIG. 10a). Route handling (step 106) may be performed to clearly identify the duplicative portion 58.

A segment pattern 62 corresponding to a query 60 may then be applied (step 110) to obtain filtered data 64. FIG. 11 illustrates six example queries 60 and accompanying segment patterns 62. In the example of FIG. 11, the segment patterns 62 correspond to the regular expression language format. However, it is understood that regular expression language format would not have to be used, and that one skilled in the art who practices this invention would have the ability to use another format, or to develop their own format for defining a segment pattern 62.

Query 60a (wildcard search) looks for an entire transportation trip by searching for a longest substring within the event string 56d that begins with a monitor start 52g ("0") and ends with a monitor stop 52h ("1").

Query 60b (wildcard search) looks for a conditioned trip by searching the longest substring within the event string 56d that begins with a condition start 52i ("X") and ends with a condition stop 52j ("Y").

Query 60c (greedy search) looks for transportation events corresponding to a distribution center 34 by searching for the longest substring starting with a distribution center arrival 52c ("C") and ending with a distribution center departure 52d ("D") and including zero or more distribution center arrivals 52c and distribution center departures 52d in between.

Query 60d (look ahead search) searches for the longest substring starting with a retail arrival 52e ("E") and ending with a condition stop 52j ("Y"), with a retail departure 52f ("F") in the event string some time after the condition stop 52j, but not included in the filtered data 64.

Query 60e (conditional search) searches for a retail segment by searching for a longest substring starting with a retail arrival 52e ("E") and ending with a retail departure 52f ("F").

Query 60f (conditional search) searches for a first part 66 or a second part 68. The "|" character represents a logic OR operator. The first part 66 is identical to the query 60d. The second part 68 searches for a retail arrival 52e ("E") ending with a retail departure 52f ("F") with any character except for a condition stop 52j ("Y") between the retail arrival 52e and the retail departure 52f, and with the retail arrival 52e ("E") not being preceded by a condition stop 52j ("Y").

As described above, it is possible for events to be recorded multiple times when using RFID technology, which could cause the formation of the duplicative portion 58 of an event string 56c (see FIGS. 10a, 10b). An appropriate segment pattern 62 may be applied to an event string 56c to accommodate the formation of the duplicative portion 58 as part of "error handling." For example, query 60c could be considered an error handling query because it looks for the longest substring starting with a distribution center arrival 52c ("C") and ending with a distribution center departure 52d ("D"), thus providing the ability to accommodate a duplicative portion in between those two events. Queries 60e and 60f could also be considered error handling queries.

One way of performing the queries 60a-60f is to generate an object list and a corresponding event string (step 104) for every shipment of transportation items 20. If the queries 60a-60f are in regular expression format as described above, a regular expression engine may be used to match each pattern against each shipment event string 56. Each event string 56 has a start index (zero for the first character of the event string, one for a second character of the event string, etc.) and an end index. For example, for the event string 56d, which includes thirty event symbols, the start index would be zero and the end index would be twenty-nine. Thus, if an event symbol 50 is the Nth character in an event string 56, the index of the event symbol would be N−1. Using the example of the query 60f, the filtered event string is "EFEY", which comes from the event string 56d, has a start index of twenty-two, and has an end index of twenty-five. Event times, as well as other event attributes, could therefore be retrieved from the twenty-second and twenty-fifth event objects.

It may be desirable to calculate a segment duration. Using Query 60f as an example, if "Event[ ]" is the name of the event object list described above, then to calculate the duration of the "EFEY" result (query 60f), this calculation for query would be "Event[25].time−Event[22].time". A more complex measure could be used to filter a temperature log to perform calculations such as mean temperature, minimum temperature, maximum temperature, etc. If further information is known, such as temperature specifications for shipped products, then additional product specific segment calculations could be performed, such as time above product maximum, time out of product range, etc.

Figure 12:
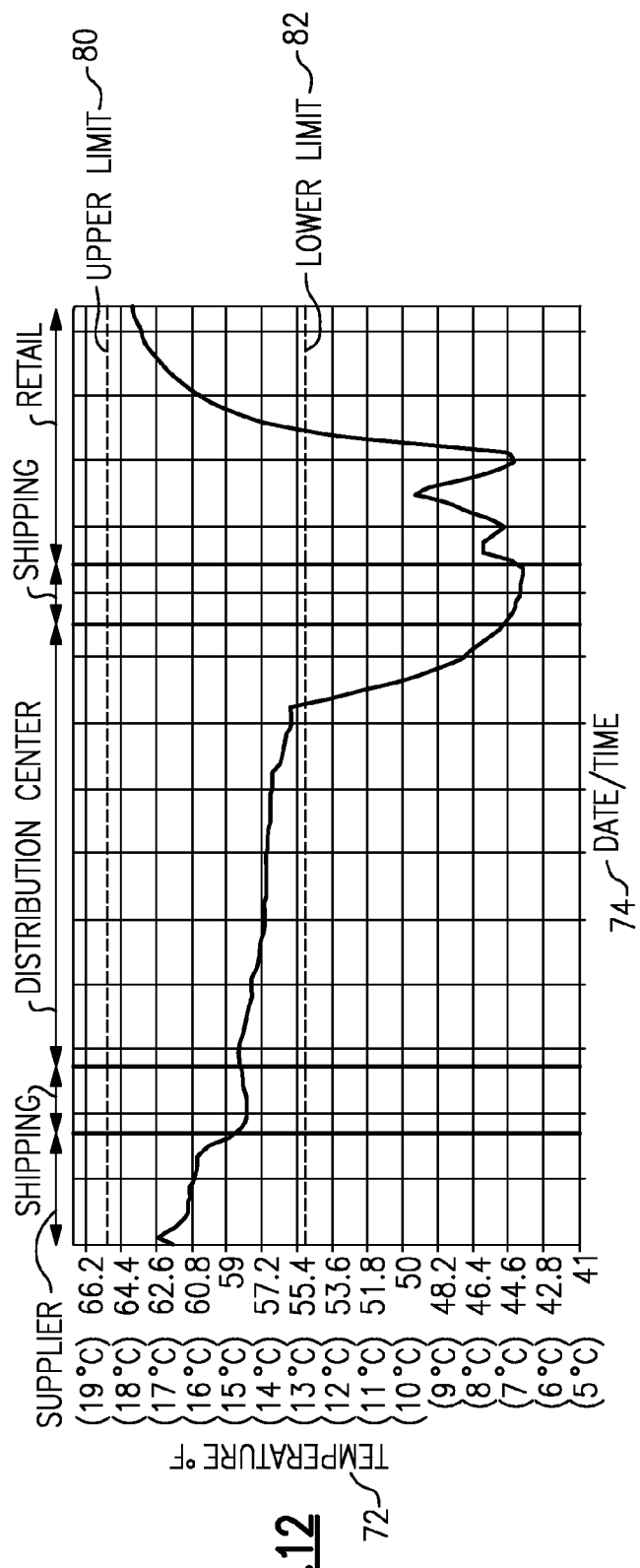
FIG. 12 illustrates a first example report.
Figure 13:
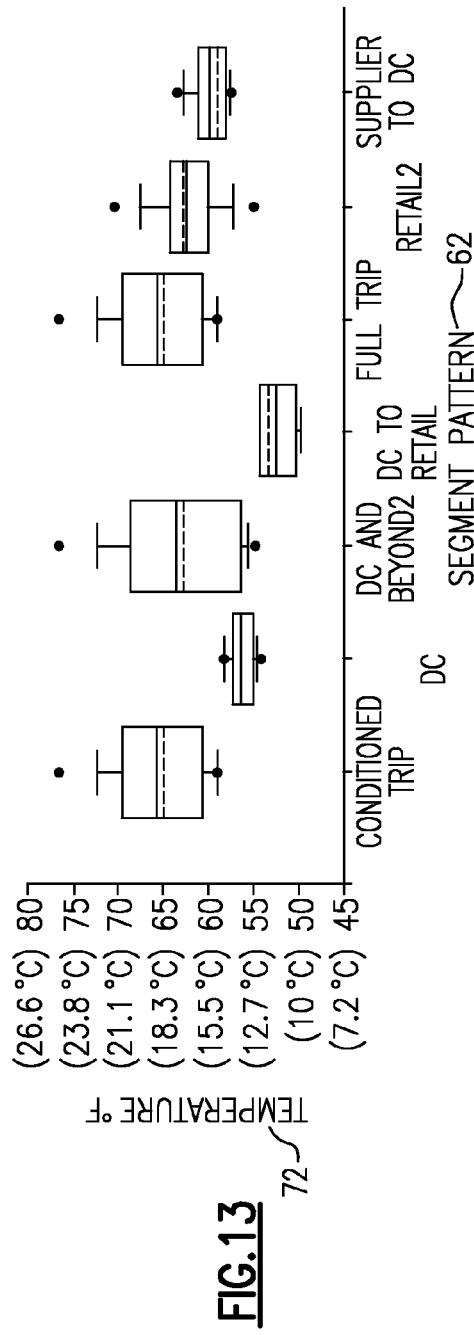
FIG. 13 illustrates a second example report.

The transportation data 40 is filtered (step 112) according to a segment pattern 62 to produce a filtered transportation data 64. The filtered transportation data 64 may be reported (step 114), and environment data corresponding to filtered data 64 may also be reported (step 116). FIG. 12 illustrates a first example report 70 illustrating temperature 72 as a function of date/time 74 as compared to an upper acceptable temperature limit 80 and a lower acceptable temperature limit 82 for a transportation item. FIG. 13 illustrates a second example report 78 illustrating how temperature 72 varies by segment pattern 62.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of analyzing transportation data, comprising the steps of:
    receiving, using a computer, a transportation data set including transportation data corresponding to at least one item, wherein the transportation data includes a plurality of transportation events each having a date and a time, and wherein the event symbols corresponding to each of the transportation events are placed in order of the time and the date at which each of the transportation events occurred;
    converting, using the computer, a portion of the transportation data into an event string, the event string including a plurality of event symbols corresponding to a plurality of transportation events, wherein each of the plurality of event symbols corresponds to a single alphanumeric character;
    selectively filtering, using the computer, the event string, according to a query, to produce a filtered event string; and
    reporting the transportation data associated with the filtered event string.

2. The method of claim 1, further comprising the steps of:
    obtaining environment data associated with the at least one item; and
    reporting the environment data corresponding to the filtered event string of the at least one item.

3. The method of claim 1, further comprising the steps of:
    assigning a location type to each of a plurality of locations present in the transportation data set; and
    assigning an event symbol to at least one event at each location type,
    wherein said step of assigning the event symbol includes assigning the event symbol to at least one of an arrival and a departure from the location type,
    and wherein the location type includes a supplier, a distribution center, and a retail location.

4. A method of analyzing transportation data, comprising the steps of:
    receiving, using a computer, a transportation data set including transportation data corresponding to at least one item;
    converting, using the computer, a portion of the transportation data into an event string, the event string including a plurality of event symbols corresponding to a plurality of transportation events, wherein each of the plurality of event symbols corresponds to a single alphanumeric character;
    assigning a first default type setting to event symbols corresponding to arrivals or departures;
    assigning a second type setting opposite the first type setting to event symbols corresponding to an arrival or a departure from an intermediate location within a location type;
    selectively filtering, using the computer, the event string according to a query to produce a filtered event string; and
    reporting the transportation data associated with the filtered event string.

5. The method of claim 1, further comprising the steps of:
    adding a condition start event symbol to the event string to identify a beginning of valid data within the event string; and
    adding a condition stop event symbol to the event string to identify an end of valid data within the event string.

6. A system for analyzing transportation data, comprising:
    a transportation data set; and
    a computer including a microprocessor operable to convert a portion of the transportation data set into an event string including a plurality of event symbols, to selectively filter the event string in response to a query to produce a filtered event string, and to report the transportation data corresponding to the filtered event string, wherein each of the plurality of event symbols corresponds to a single alphanumeric character, wherein the filtered event string is representative of a subset of the transportation data set, and wherein a first default type setting is assigned to event symbols corresponding to arrivals and departures, and a second type setting opposite the first type setting is assigned to event symbols corresponding to an arrival or departure from an intermediate location within a location type.

7. The system of claim 6, wherein the transportation data set corresponds to at least one transportation item, the transportation data set including transportation data.

8. The system of claim 6, wherein the transportation data set includes a date and a time for at least one of an arrival or a departure of the at least one transportation item at a plurality of locations.

9. The system of claim 7, wherein the transportation data set includes environment data, including a temperature of the at least one transportation item recorded at a predefined set of time intervals.

10. The system of claim 7, further comprising a data recordation unit associated with the at least one transportation item, wherein the data recordation unit is operable to record transportation data, wherein the data recordation unit includes a monitor operable to record environment data, and wherein the data recordation unit is attached to the at least one transportation item or its packaging.

11. The system of claim 7, wherein the at least one transportation item has an associated unique identifier corresponding to a radio frequency identification tag having a global location number.

12. The system of claim 8, wherein the microprocessor corresponds to a first microprocessor, and wherein each of the plurality of locations has a second microprocessor operable to record the arrival and the departure of the at least one transportation item to form a portion of the transportation data set.

13. The system of claim 6, wherein the query is in a regular expression language format.

14. The system of claim 6, wherein the plurality of event symbols includes a symbol for at least one of an arrival or a departure for each of a plurality of location types.

15. The system of claim 6, wherein a condition start event symbol is added to the event string to identify a beginning of valid data within the event string, and wherein a condition stop event symbol is added to the event string to identify an end of valid data within the event string.

16. The system of claim 6, wherein each event symbol in the event string is associated with an event, and wherein each event symbol is a data structure having a plurality of attributes to store transportation data.

17. The method of claim 1, wherein the filtered event string is representative of a subset of the transportation data, based on said query.

18. The method of claim 1, wherein the query is a request for a specific portion of the transportation data.

* * * * *